US009855527B2

(12) United States Patent
Stender et al.

(10) Patent No.: US 9,855,527 B2
(45) Date of Patent: Jan. 2, 2018

(54) METHOD FOR CLEANING BYPASS GASES OF THE CEMENT OR MINERAL INDUSTRY, AND SYSTEM OF THE CEMENT OR MINERAL INDUSTRY

(71) Applicant: ThyssenKrupp Industrial Solutions AG, Essen (DE)

(72) Inventors: Timo Stender, Fröndenberg (DE); Melanie Flaßpöhler, Dortmund (DE); Kathrin Rohloff, Hamburg (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 15/034,542

(22) PCT Filed: Nov. 6, 2014

(86) PCT No.: PCT/EP2014/002966
§ 371 (c)(1),
(2) Date: May 4, 2016

(87) PCT Pub. No.: WO2015/067363
PCT Pub. Date: May 14, 2015

(65) Prior Publication Data
US 2016/0279569 A1    Sep. 29, 2016

(30) Foreign Application Priority Data
Nov. 6, 2013    (DE) .................. 10 2013 112 210

(51) Int. Cl.
*B01D 53/10* (2006.01)
*B01D 53/90* (2006.01)
(Continued)

(52) U.S. Cl.
CPC ......... *B01D 53/8656* (2013.01); *B01D 53/06* (2013.01); *B01D 53/8653* (2013.01);
(Continued)

(58) Field of Classification Search
CPC .............. B01D 53/10; B01D 2257/302; B01D 2257/404; B01D 2257/502;
(Continued)

(56) References Cited

U.S. PATENT DOCUMENTS 5,704,780 A * 1/1998 Bauer ................. C04B 7/47
432/106
5,937,771 A * 8/1999 Sutoh ................. C04B 7/436
106/745
(Continued)

FOREIGN PATENT DOCUMENTS

AT      10 369 U1    2/2009
AT     507 773 A4    8/2010
(Continued)

OTHER PUBLICATIONS

German language International Search Report for International patent application No. PCT/EP2014/002966; dated Feb. 5, 2015.
(Continued)

*Primary Examiner* — Timothy C Vanoy
(74) *Attorney, Agent, or Firm* — thyssenkrupp North America, Inc.

(57) ABSTRACT

A method for cleaning bypass gases of the cement or mineral industry includes cooling down a removed bypass gas from a cement or mineral processing plant to a temperature of between 500° C. and 150° C., and coarsely dedusting the bypass gas, the dust burden being reduced by 30 to 95%. After the dedusting step, the gaseous constituents contained in the partly dedusted bypass gas are reduced in a reducing step. The partly dedusted bypass gas is further finely dedusted. The gaseous constituents reducing step includes at least a catalytic reduction of one or more of nitrogen oxides, hydrocarbons, and carbon monoxide.

9 Claims, 3 Drawing Sheets

(51) Int. Cl.
    *B01D 53/06*       (2006.01)
    *B01D 53/86*       (2006.01)
    *B01D 53/56*       (2006.01)
    *B01D 53/62*       (2006.01)
    *B01D 53/72*       (2006.01)
    *B01D 46/00*       (2006.01)
    *B01D 46/48*       (2006.01)
    *C04B 7/43*        (2006.01)
    *C04B 7/36*        (2006.01)

(52) U.S. Cl.
    CPC .............. *B01D 53/90* (2013.01); *C04B 7/364* (2013.01); *C04B 7/365* (2013.01); *C04B 7/43* (2013.01); *C04B 7/436* (2013.01); *B01D 53/10* (2013.01); *B01D 2251/602* (2013.01); *B01D 2257/302* (2013.01); *B01D 2257/404* (2013.01); *B01D 2257/502* (2013.01); *B01D 2257/702* (2013.01); *B01D 2258/0233* (2013.01)

(58) Field of Classification Search
    CPC ...... B01D 2257/702; B01D 2258/0233; B01D 53/90; B01D 53/8653; B01D 53/06; B01D 2251/602; B01D 53/8656; B01D 53/56; B01D 53/62; B01D 53/72; B01D 46/00; B01D 46/48; C04B 7/436; C04B 7/43; C04B 7/364; C04B 7/365
    See application file for complete search history.

(56) References Cited

U.S. PATENT DOCUMENTS

| | | |
|---|---|---|
| 7,553,155 B2 | 6/2009 | Erpelding et al. |
| 9,314,739 B2 | 4/2016 | Lisberger |
| 2004/0111958 A1 * | 6/2004 | Oates ........................ C10L 5/00 44/505 |
| 2010/0307388 A1 | 12/2010 | Secklehner |

FOREIGN PATENT DOCUMENTS

| | | | | |
|---|---|---|---|---|
| CN | 101385934 A | * | 3/2009 | ............ B01D 50/00 |
| DE | 274022 A1 | | 12/1989 | |
| DE | 102004018571 A1 | | 11/2005 | |
| DE | 102009022903 A1 | | 12/2010 | |
| EP | 0534225 A1 | | 3/1993 | |
| EP | 2287126 A1 | | 2/2011 | |
| JP | 2009 298677 A | | 12/2009 | |
| JP | 2010 195615 A | | 9/2010 | |
| KR | 101347877 B1 | * | 1/2014 | ............ B01D 45/08 |
| WO | 03/055577 A1 | | 7/2003 | |
| WO | 2010136396 A1 | | 12/2010 | |

OTHER PUBLICATIONS

English translation of International Search Report for International patent application No. PCT/EP2014/002966; dated Feb. 5, 2015.

German language Written Opinion of the International Search Authority for International patent application No. PCT/EP2014/002966; dated Feb. 5, 2015.

English translation of the abstract for Japanese patent application No. JP 2010195615 A.

English translation of the abstract for Japanese patent application No. JP 2009298677 A.

English translation of the abstract for European patent application No. EP 0534225 A1.

* cited by examiner

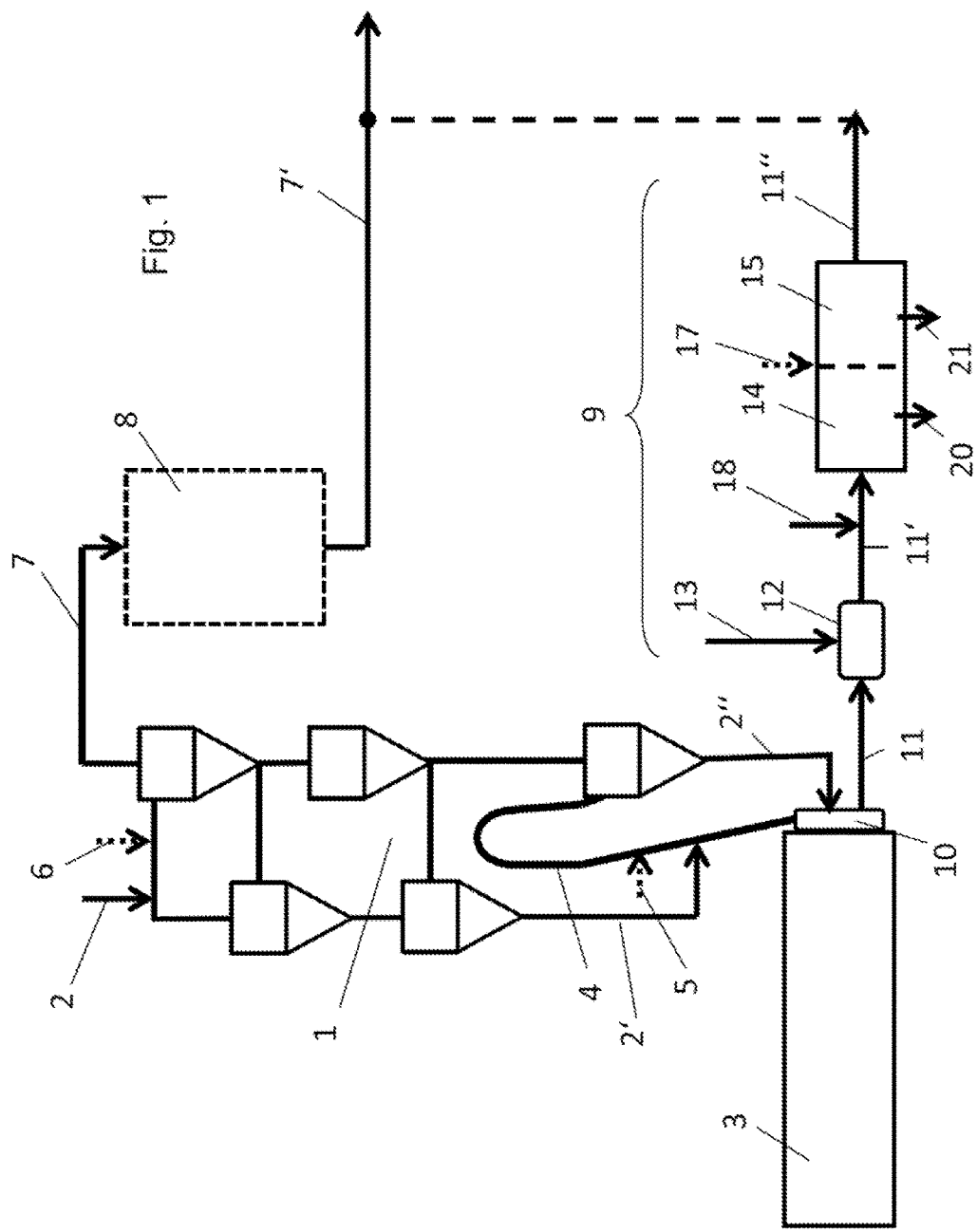

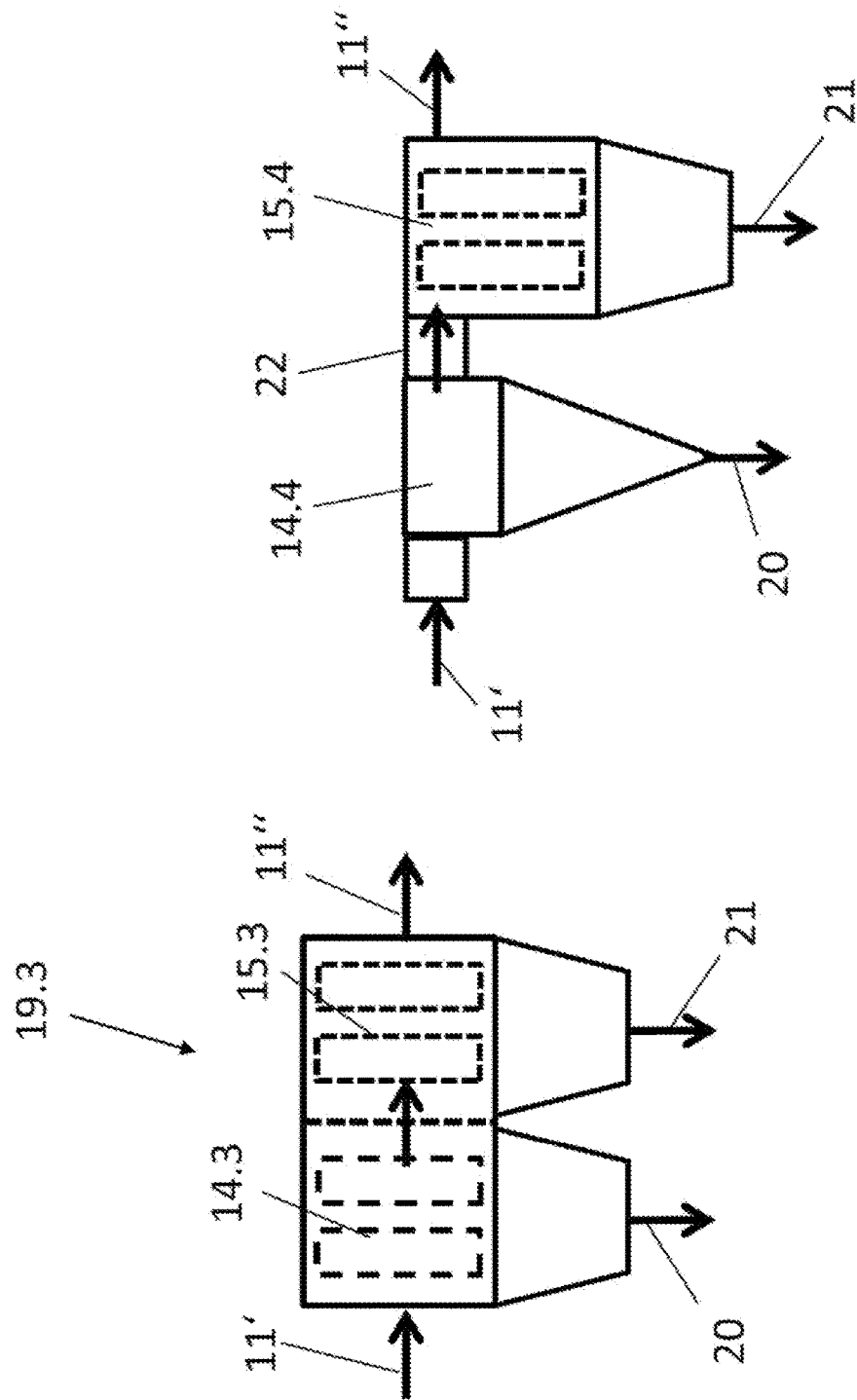

METHOD FOR CLEANING BYPASS GASES OF THE CEMENT OR MINERAL INDUSTRY, AND SYSTEM OF THE CEMENT OR MINERAL INDUSTRY

CROSS REFERENCE TO RELATED APPLICATIONS

This application is a U.S. National Stage Entry of International Patent Application Serial Number PCT/EP2014/002966, filed Nov. 6, 2014, which claims priority to German patent application no. DE 102013112210.8 filed Nov. 6, 2013, the entire contents of both of which are incorporated herein by reference.

FIELD

The invention relates to a method for cleaning bypass gases of the cement or mineral industry and to a plant of the cement or mineral industry with a kiln and a bypass system connected thereto for drawing off a bypass gas.

BACKGROUND

In clinker production, the proportion of alternative fuels is increasing greatly, which in turn results in an increasing input of chlorine into the production process. On account of its evaporation and condensation temperatures, chlorine forms an internal circulation in the preheater/kiln system. This circulation is relieved by way of a bypass system, in which part of the kiln gas is removed at the kiln inlet. Such a bypass may also be used for discharging SO2 and alkalis. Increasing use of alternative fuels in some cases requires high bypass rates of the order of up to 10% and more. The bypass offgas is branched off at the furnace inlet at temperatures of, for example, more than 600° C. or of more than 1000° C., depending on the application of the kiln system, and shortly after being drawn off is quenched, for example in the so-called bypass bell or a heat exchanger, to 500 to 150° C., preferably 400 to 200° C., most preferably 370 to 240° C. At these temperatures, the gas can be fed to an electrostatic or fabric filter for dust separation. On account of their condensation temperatures, gaseous chlorine and sulfur are therefore also incorporated in the bypass filter.

According to DD 274 022 A1, an alkali- and chlorine-containing bypass gas is branched off from the clinker burning process at temperatures of 1050 to 1250° C. and cooled down by supplying fresh air to 700 to 1050° C. After that, 50 to 70% of the dust contained in the gas stream is separated from the gas stream and fed back to the burning process. As a result of the low degree of separation in the separation of the dust from the gas stream, only the low-alkali, coarse-grained dust fractions are separated out of the gas stream and returned to the burning process. At temperatures of 700 to 1050° C., the alkalis are partly still volatile or are only precipitated on the smallest grain fractions of the dust. After further cooling, these harmful substances are then separated from the gas stream.

Nitrogen oxides are produced during clinker production on account of the high temperatures in the kiln due to the oxidation of nitrogen from the combustion air. This is typically alleviated by a staged combustion and the injection of an ammonia-containing reducing agent in the region of the calciner or kiln inlet. Nitrogen oxides in the kiln offgas are also removed by means of catalytic converters in the downstream offgas system.

If there are high requirements for the nitrogen oxide concentration in the clean gas, such as for example the 200 mg/Nm$^3$ stipulated by the 17th German Federal Emission Control Ordinance for the co-combustion of waste in cement works, for many plants the nitrogen concentration in an averaged offgas concentration of bypass and kiln gas cannot be made to comply. An improvement can be achieved by denitration of the bypass gas. However, the SNCR reaction can only take place unsatisfactorily on account of the low dwell times at sufficiently high temperatures in the bypass gas. Classic SCR catalytic converters have a comparatively high system expenditure and can only respond inadequately to fluctuating dust loads, such as occur in the bypass gas.

Accordingly there is a need for an improved method and system for reducing harmful gaseous substances in the bypass gas of the cement or mineral industry.

BRIEF DESCRIPTION OF THE DRAWINGS

The present disclosure is described in detail below with reference to the attached drawing figures, wherein:

FIG. 1 is a schematic view of an embodiment of a cement or mineral processing/production plant having a bypass system for drawing off a bypass gas, as presently disclosed herein;

FIG. 4 is a schematic view of an embodiment of a hybrid filter having a first chamber formed as a filtering separator, as presently disclosed herein;

FIG. 5 is a schematic view of an embodiment of the bypass system of FIG. 1 having a coarse dedusting device formed as a centrifugal separator, as presently disclosed herein;

DETAILED DESCRIPTION

Figure 3:
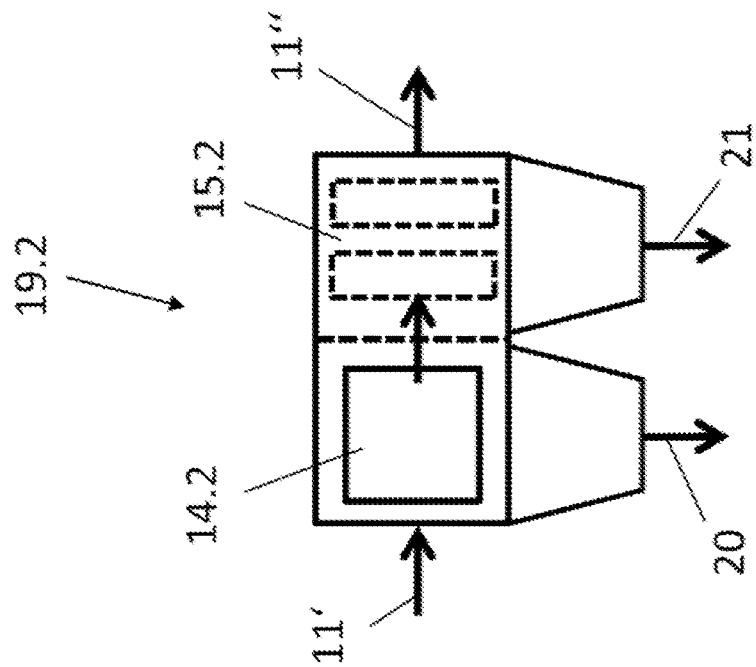
FIG. 3 is a schematic view of an embodiment of a hybrid filter having a first chamber formed as an electrostatic separator, as presently disclosed herein.

A method for cleaning bypass gases of the cement or mineral industry is disclosed herein. In one embodiment, the method includes cooling down a removed bypass gas from a cement or mineral processing plant to a temperature of between 500° C. and 150° C., preferably between 400° C. and 200° C., and most preferably between 370° C. and 240° C. The bypass gas is also coarsely dedusted, the dust burden being reduced by 30 to 95%, preferably 50 to 95%, and most preferably 80 to 95%. It should be noted that the order of performing the cooling and dedusting steps may be reversed and still be within the scope of the present disclosure.

After the coarse dedusting step, the gaseous constituents contained in the partly dedusted bypass gas are reduced in a reducing step that includes at least a catalytic reduction of one or more of nitrogen oxides, hydrocarbons, and carbon monoxide. The partly dedusted bypass gas is further finely dedusted.

The plant of the cement or mineral industry according to the invention with a kiln and a bypass system connected thereto for drawing off a bypass gas provides the following devices with respect to the bypass system:

a. a cooling device for cooling down the removed bypass gas to 500 to 150° C., preferably 400 to 200° C., most preferably 370 to 240° C.

b. a coarse dedusting device for reducing the dust burden of the bypass gas by 30 to 95%, preferably 50 to 95%, most preferably 80 to 95%
c. a cleaning device for reducing the gaseous constituents contained in the partly dedusted bypass gas, which comprises a fine dedusting stage, the cleaning device comprising a separator doped with catalytically active components.

The offgases of a plant of the cement or mineral industry are made up of the preheater offgases and the bypass gas. Until now, only the preheater offgas has been reduced in its nitrogen oxide concentrations to the extent allowing compliance with the limit values even after mixing with the previously not denitrated bypass gas. On account of the increasing use of alternative fuels, however, the circulations of harmful substances are increasing enormously, so that a higher bypass gas rate has to be branched off. The proposed denitration of the bypass gas according to the invention makes it possible to comply with the low limit values in this case too.

The reduction of the nitrogen oxides expediently takes place at temperatures of 500 to 150° C., preferably 400 to 200° C., most preferably 370 to 240° C. In the case of the method for producing calcined material with the aid of a kiln, a partial amount of kiln offgases produced in a kiln is drawn off as bypass gas and cleaned according to the above measures. Furthermore, the nitrogen oxides of the remaining kiln offgas are reduced, for example by means of an SNCR process, before the kiln offgas is reunified with the cleaned bypass gas. In the further offgas system, further stages of the method, such as raw- and coal-grinding mills or cooling towers, may be included upstream or downstream of the reunification of the offgases. In technical terms of the plant, the kiln is then followed by an offgas system with an SNCR device for reducing the nitrogen oxides. The bypass gas is branched off from the offgas system in the region of the kiln and after the SNCR device is re-connected to the offgas system or emitted by way of a separate flue. If the latter is the case, the compliance of the nitrogen oxide emissions is determined by way of a mixed calculation involving the volumetric flow and the nitrogen oxide concentration of the two offgas sources. A mixed calculation may likewise be used if further emission sources are installed, such as for example a coal-grinding mill with a separate flue.

If the coarse dedusting device and the cleaning device are accommodated in a hybrid filter created from at least two chambers, the removal of the dusts takes place in the first chamber, for example by electrostatic forces, while the removal of the nitrogen oxides takes place in the second, filtering chamber, along with the separation of fine dusts. With the aid of an injected reducing agent, for example ammonia water, a reduction of the nitrogen oxides takes place at a separator doped with catalytically active components. The catalytic material is preferably introduced into or applied to a ceramic or other filtering material, such as for example Teflon or fiberglass. The ammonia-containing reducing agent that is required for the denitration of the bypass gases may be injected before or after the coarse dedusting. The prior dedusting of the bypass gas is advantageous because in the bypass gas there may be dust burdens that are relatively greater than 100 g/Nm$^3$. However, a high dust burden requires high cleaning-off pressures on fabric filters, which reduce the stability and the function of the media for the catalytic cleaning. Furthermore, there are high pressure losses. Along with the nitrogen oxides, hydrocarbons and/or carbon monoxide, which are produced as a result of incomplete combustion in the kiln inlet, could also be catalytically reduced.

In a further embodiment, along with the separation of dust, a fine cleaning of acidic gas constituents that are contained, such as $SO_2$ or HCl, takes place. The cooling down of the bypass gas removed and the dedusting have the effect that these constituents in the bypass gas are typically reduced by more than 90%. Since, however, even lower emissions of these substances are undesired, these may be reduced for example by injecting a suitable solvent (such as sodium bicarbonate) into the bypass gas. Sodium bicarbonate is typically deposited on a filtering fabric after injection into the offgas. As it flows through, a high separating rate of the acidic constituents contained takes place as a result of a chemical reaction. If the sodium carbonate were injected into the dust-laden bypass gas, the high separating rate would be lowered significantly on account of the much higher dust fraction in comparison with the injected amount of sodium bicarbonate. Apart from sodium bicarbonate, other substances, such as lime hydrate or burnt lime, as well as treated reactants of clinker production, such as raw meal and filter dust, may also be used for the separation or for optimizing the separation or the process.

The methods of offgas denitration and the removal of acidic harmful substances are preferably combined with one another. After the coarse dedusting, an injection of sodium bicarbonate and an ammonia-containing reducing agent takes place. The separation of acidic harmful gases and nitrogen oxides takes place simultaneously and in the downstream cleaning device. On account of the incorporation of $SO_2$ and $SO_3$, at the same time there is the associated reaction of the sulfur compounds with $NH_3$. The temperature-dependent formation of ammonia salts at high partial pressures of $NH_3$ and $SO_2$ and $SO_3$ may lead to a deactivation of the catalytically active components and prevent the breakdown of the nitrogen oxides, so that the bypass gas should not be cooled down below 150° C.

The plant of the cement and mineral industry that is represented in FIG. 1 substantially consists of a preheater 1, which is formed here as a 5-stage cyclone preheater and in which raw meal 2 is preheated with offgases from a kiln 3. The preheated material 2' subsequently passes into a calciner 4, which is likewise flowed through by the offgases of the kiln 3. The pre-calcined raw meal 2" is finally fed to the kiln 3. For the denitration of the kiln offgas by the SNCR process, means 5 for injecting a reducing agent are provided in the region of the calciner 4. Optional means 6 for injecting a reducing agent may also be arranged in the upper region of the preheater 1.

The kiln offgas 7 leaving the preheater 1 is possibly denitrated further in an optional SCR reactor 8. Furthermore, it is possible to denitrate the kiln offgas 7 exclusively with the SCR reactor 8 and to dispense with the SNCR injection 5.

To interrupt the circulations of harmful substances that are produced between the kiln 3 and the preheater 1, a bypass system 9 is provided. For this purpose, part of the kiln offgas is branched off as bypass gas 11 in the region of the kiln inlet 10. Depending on which fuel is used in the region of the kiln 3 and the calciner 4, the amount to be drawn off as bypass gas may well make up 10% or more of the offgas flowing out of the kiln 3. In a cooling device 12 of the bypass system 9, the hot bypass gas, which initially is for example over 1000° C., is cooled down to 500 to 150° C., preferably 400 to 200° C., most preferably 370 to 240° C. The cooling device 12 may in this case be formed as a mixing chamber, the bypass gas 11 being mixed with fresh air 13. The cooled-down bypass gas 11' subsequently passes into a coarse dedusting device 14 for reducing the dust burden of the cooled-down bypass gas by 30 to 95%, and subsequently into a cleaning device 15 for reducing the gaseous constituents contained in the partly dedusted bypass gas, which comprises a fine dedusting stage. The cleaning stage 15 also has a separator doped with catalytically active components for reducing nitrogen oxides. Upstream or downstream of the coarse dedusting device 14, optional means 17 for injecting a sorbent for desulfurization and optional means 18 for injecting a reducing agent for the SCR reaction may be provided.

Figure 2:
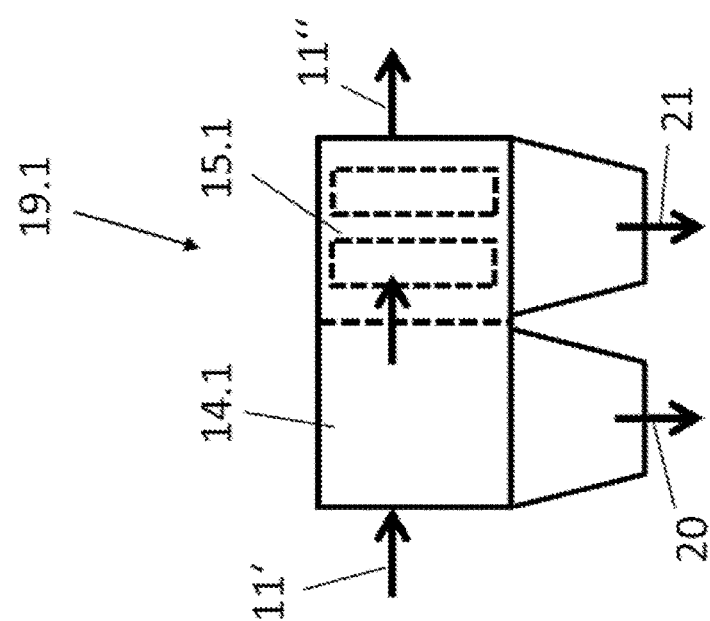
FIG. 2 is a schematic view of an embodiment of a hybrid filter having a first chamber formed as a gravitational separator, as presently disclosed herein.

Various exemplary embodiments for realizing the coarse dedusting device 14 and the cleaning device 15 are described below on the basis of FIG. 2 to FIG. 5. FIG. 2 to FIG. 4 thereby show a preferred embodiment, in which the coarse dedusting device 14 and the cleaning device are accommodated in a hybrid filter 19.1, 19.2 and 19.3 consisting of at least two chambers, the coarse dedusting device being accommodated in the first chamber and the cleaning device being accommodated along with the fine dedusting stage in the second chamber.

According to FIG. 2, the coarse dedusting device of the hybrid filter 19.1 is formed as a gravitational separator 14.1. The cleaning device in the second chamber of the hybrid filter 19.1 is formed by a separator 15.1 doped with catalytically active components. In the gravitational separator, first the coarse dust 20 is separated from the cooled-down bypass gas 11', which is then preferably returned again and for example admixed with the raw meal at a suitable point. In the cleaning device 15.1, the reaction of nitrogen oxides and possibly other acidic gas constituents takes place at the separator 15.1. The fine dust 21 discharged there has a high burden and is usually discarded. The bypass gas then leaves the separator 15.1 as cleaned bypass gas 11".

The hybrid filter 19.2 that is represented in FIG. 3 differs only in the region of the first chamber, here the coarse dedusting device being formed by an electrostatic separator 14.2. In the second chamber, a separator 15.2 doped with catalytically active components is in turn provided.

In the third exemplary embodiment according to FIG. 4, the coarse dedusting device of the first chamber of the hybrid filter 19.3 is formed as a filtering separator 14.3.

According to the invention, however, the coarse dedusting device and the cleaning device do not necessarily have to be arranged within a common housing of a hybrid filter. In the exemplary embodiment according to FIG. 5, therefore, the coarse dedusting device is formed as a centrifugal separator 14.4, which is connected by way of a connecting line 22 to a separator 15.4 doped with catalytically active components.

However, the preferred refinement of the invention is that the coarse dedusting device 14 and the cleaning device 15 should be accommodated in a hybrid filter consisting of two chambers, not only the fine dedusting that is customary with hybrid filters but at least also a denitration with the aid of a separator doped with catalytically active components being provided in the second chamber. Furthermore, there is also the possibility of using the fine dust 21 to discharge acidic constituents, such as $SO_2$, $SO_3$, HCl and HF, with the aid of a sorbent injected by way of the means 17.

The bypass gas 11" cleaned in this way, in particular denitrated, can therefore be reunified without any problem with the denitrated kiln offgas 7', without the limit values for nitrogen oxides being exceeded here, even when there is a large proportion of bypass gas. Alternatively, the compliance of the nitrogen oxide emissions is possible by way of a mixed calculation, or else the flues could have separate gas purity requirements in their approval certificates and comply with them by means of the method described.

Apart from the cleaning of the bypass offgases drawn off at the kiln inlet, it is also possible to branch off a gas bypass at other points in the kiln-preheater system and feed this gas to the corresponding stages of the method. The cooling down of the other gas bypass could be used for example for heat recovery. For this, the removal of gas comprising up to 50% of the total gas stream could take place.

What is claimed is:

1. A method for cleaning bypass gases extracted from a plant offgas of the cement or mineral industry comprising:
    cooling down a removed bypass gas from a cement or mineral processing plant to a temperature of between 500° C. and 150° C.;
    coarsely dedusting the bypass gas, the dust burden being reduced by between 30% and 95%;
    reducing gaseous constituents contained in the partly dedusted bypass gas by at least catalytically reducing nitrogen oxides either alone or together with one or more of hydrocarbons, and carbon monoxide present in the bypass gas;
    finely dedusting the bypass gas;
    injecting a reducing agent into the bypass gas; and
    passing the bypass gas through a separator doped with catalytically active components, said injecting step and passing step being configured to aid in a reduction of nitrogen oxides in the bypass gas,
    wherein said cooling and dedusting steps are performed with the use of a hybrid filter having at least a first and a second chamber, said coarse dedusting step taking place in the first chamber, and both of said steps of reducing nitrogen oxides and finely dedusting taking place in the second chamber.

2. The method of claim 1, wherein in said catalytic reducing step, the catalytic reduction uses at least one of Teflon™ with catalytically active components, ceramic filters with catalytically active components, or fiberglass with catalytically active components as separators for the catalytic reduction.

3. The method of claim 1, wherein the catalytic reduction occurs when the bypass gas is at a temperature of between 150° C. and 500° C.

4. The method of claim 1, wherein during said reducing step, acidic constituents of the bypass gas are reduced with the aid of an injected sorbent.

5. The method of claim 1, wherein said reducing step includes injecting at least one of treated reactants of clinker production, lime hydrate, or burnt lime, into the bypass gas stream so as to optimize the process of reducing gaseous constituents from the bypass gas.

6. A method for producing calcined material, comprising:
    drawing off as bypass gas a partial amount of kiln offgases produced in a production kiln;
    cleaning the bypass gas by:
        cooling down the bypass gas to a temperature of between 500° C. and 150° C.,
        coarsely dedusting the bypass gas, the dust burden being reduced by between 30% and 95%,
        reducing gaseous constituents contained in the partly dedusted bypass gas by at least catalytically reducing one or more of nitrogen oxides, hydrocarbons, and carbon monoxide, and
        finely dedusting the bypass gas;
    reducing nitrogen oxides present in the remaining kiln offgas by at least one of a SNCR or SCR process; and at least one of reunifying the kiln offgas with the cleaned bypass gas or emitting the kiln offgas, by way of a separate flue.

7. A plant of the cement or mineral industry comprising:
a kiln; and
a bypass system operatively connected to said kiln and configured to draw off a bypass gas from the plant offgas, the bypass system (9) comprising:
   a cooling device configured to cool down the removed bypass gas to a temperature of between 500° C. to 150° C.,
   a coarse dedusting device in operative communication with said cooling device and configured to reduce a dust burden of the bypass gas by between 30% and 95%,
   a cleaning device in operative communication with at least one of said cooling device or said coarse dedusting device, and configured to reduce the gaseous constituents contained in the partly dedusted bypass gas, which cleaning device comprises a fine dedusting stage and a separator doped with catalytically active components to aid in the reduction of the gaseous constituents from the bypass gas.

8. The plant of claim 7, wherein said coarse dedusting device and said cleaning device are disposed in a hybrid filter comprising at least a first and a second chamber, said coarse dedusting device being accommodated in said first chamber and said cleaning device being accommodated along with a fine dedusting stage in said second chamber.

9. The plant of claim 7, further comprising:
   an offgas system disposed downstream of said kiln and having an SNCR device configured to reduce nitrogen oxides in the offgas, wherein said bypass system is branched off from said offgas system in a region of the kiln and after an SNCR or SCR device is one of re-connected to the offgas system or emitted by way of a separate flue.

* * * * *